United States Patent
Pirner et al.

(10) Patent No.: US 8,336,406 B2
(45) Date of Patent: Dec. 25, 2012

(54) PROTECTION ELEMENTS FOR PIPELINE INVESTIGATION DEVICES

(75) Inventors: Paul Pirner, Mississauga (CA); Vyacheslav Akulshyn, Mississauga (CA)

(73) Assignee: Baker Hughes Incorporated, Houston, TX (US)

( * ) Notice: Subject to any disclaimer, the term of this patent is extended or adjusted under 35 U.S.C. 154(b) by 182 days.

(21) Appl. No.: 12/046,044

(22) Filed: Mar. 11, 2008

(65) Prior Publication Data

US 2008/0224465 A1 Sep. 18, 2008

Related U.S. Application Data

(60) Provisional application No. 60/894,414, filed on Mar. 12, 2007.

(51) Int. Cl.
*G01M 99/00* (2011.01)
(52) U.S. Cl. .................. 73/865.8; 324/699; 324/71.1
(58) Field of Classification Search ............ 73/40.5, 73/865.8; 324/72.5, 699, 700, 71.1
See application file for complete search history.

(56) References Cited

U.S. PATENT DOCUMENTS

| | | | | |
|---|---|---|---|---|
| 2,980,854 A | * | 4/1961 | En Dean et al. | 324/72 |
| 3,940,855 A | * | 3/1976 | Ver Nooy et al. | 33/544 |
| 3,949,292 A | * | 4/1976 | Beaver et al. | 324/220 |
| 4,389,788 A | * | 6/1983 | Balogh et al. | 33/555.1 |
| 4,443,948 A | * | 4/1984 | Reeves | 33/544.3 |
| 4,447,777 A | * | 5/1984 | Sharp et al. | 324/220 |
| 4,742,298 A | | 5/1988 | Ando et al. | |
| 4,804,906 A | | 2/1989 | Hamberg et al. | |
| 4,857,831 A | | 8/1989 | Davies et al. | |
| 5,337,485 A | * | 8/1994 | Chien | 33/550 |
| 5,359,939 A | * | 11/1994 | Watt | 104/138.2 |
| 5,426,367 A | | 6/1995 | Martin et al. | |
| 5,565,633 A | | 10/1996 | Wernicke | |
| 5,717,334 A | | 2/1998 | Vail, III et al. | |
| 5,747,998 A | | 5/1998 | Fowler et al. | |
| 5,864,232 A | * | 1/1999 | Laursen | 324/220 |
| 6,031,381 A | | 2/2000 | Vail, III et al. | |
| 6,066,034 A | | 5/2000 | Hettes et al. | |
| 6,232,773 B1 | * | 5/2001 | Jacobs et al. | 324/220 |
| 6,359,434 B1 | | 3/2002 | Winslow et al. | |
| 6,474,165 B1 | | 11/2002 | Harper et al. | |
| 6,489,771 B1 | | 12/2002 | Farque | |
| 6,538,431 B2 | | 3/2003 | Couchman et al. | |
| 6,553,322 B1 | | 4/2003 | Ignagni | |
| 6,680,619 B1 | | 1/2004 | Horn | |
| 7,104,147 B2 | | 9/2006 | Pots et al. | |
| 7,421,914 B2 | * | 9/2008 | Stanley et al. | 73/865.8 |
| 2001/0029989 A1 | | 10/2001 | Paz | |
| 2002/0196160 A1 | | 12/2002 | Hilleary | |
| 2003/0074162 A1 | | 4/2003 | Fourie et al. | |
| 2003/0121338 A1 | | 7/2003 | Yates | |
| 2003/0189435 A1 | | 10/2003 | Yunovich et al. | |

(Continued)

FOREIGN PATENT DOCUMENTS

EP 260355 A * 3/1988

*Primary Examiner* — Hezron E Williams
*Assistant Examiner* — Nashmiya Fayyaz
(74) *Attorney, Agent, or Firm* — Mossman, Kumar & Tyler, PC

(57) ABSTRACT

A conduit interrogation tool is provided that includes a pair of spaced apart contact elements that deform as the tool moves in the conduit. A deformation control member positioned proximate the contact element reduces or limits deformation of the contact element to a desired extent.

5 Claims, 2 Drawing Sheets

U.S. PATENT DOCUMENTS

| | | |
|---|---|---|
| 2003/0198374 A1 | 10/2003 | Hagene et al. |
| 2004/0189289 A1 | 9/2004 | Atherton |
| 2005/0168208 A1* | 8/2005 | Pots et al. .................... 324/72.5 |
| 2006/0248966 A1* | 11/2006 | Houldey et al. .............. 73/865.8 |

* cited by examiner

PROTECTION ELEMENTS FOR PIPELINE INVESTIGATION DEVICES

CROSS REFERENCE TO RELATED APPLICATIONS

This application takes priority from U.S. Provisional Application Ser. No. 60/894,414, filed on Mar. 12, 2007.

BACKGROUND OF THE DISCLOSURE

1. Field of the Disclosure

The present disclosure relates to arrangements and methods for interrogation devices.

2. Description of the Related Art

Structures, such as conduits carrying fluids, degrade due to corrosion. It is often desirable to inspect and evaluate the condition of such structures. Inspections may include an evaluation of structural integrity, the identification and quantification of undesirable materials and the analysis of the nature and extent of corrosion. The evaluation of structures may also include an assessment of the effectiveness of devices and equipment utilized to mitigate the effects of wear, minimize the occurrence of sediments and deposits and reduce corrosion. A conduit or pipeline, such as may be employed to transport hydrocarbons, chemicals and water is one type of structure in which a periodic inspection can yield a variety of benefits such as improved service life and reduced likelihood of leaks.

In some instances an inspection device, sometimes referred to as a "pig," is passed through the pipeline to perform one or more measurements that provide an indication of the condition of the pipeline. Some such devices utilize components that can be damaged when subjected to high mechanical loadings or to an impact of sufficient magnitude. Deformities or surface discontinuities in pipelines, among other things, can cause high mechanical loading or undesirable impact on the inspection device, thereby damaging one or more components of the inspection device. Such a damage can result in the measurements obtained by the inspection device being inaccurate. Therefore, it is desirable to have an inspection device that provides relatively accurate measurements in such less-than-ideal operating environments.

SUMMARY OF THE DISCLOSURE

In one aspect, the present disclosure provides an apparatus for interrogating a conduit, wherein the apparatus includes at least one deformable element that engages a surface of the conduit. The apparatus uses the at least one deformable element to estimate or determine a parameter of interest relating to the conduit. The apparatus further includes at least one deformation control member proximate or positioned adjacent to the at least one deformable element to protect the deformable element from one or more features of the conduit. In one aspect, the deformation control element may protect the at least one deformable element by controlling the extent of the deformation experienced by the at least one deformable element. In another aspect, the at least one deformation control element may be more rigid than the at least one deformable element so that the deformation control member takes over or assumes a loading that would otherwise deform the at least one deformable element to an undesirable extent. In one aspect, the at least one deformable element may be arranged in a generally circumferential manner and wherein the at least one deformation control member limits a movement or of the at least one deformable element or a reduction in a radial dimension of the at least one deformable element.

In one aspect, the interrogation tool may be configured to estimate or determine an electrical property of the conduit. In one aspect, the at least one deformable element includes at least one electrically conductive element. For instance, the at least one deformable element may include a plurality of electrically conductive elements that are circumferentially disposed on a radial outer surface of an annular disk. In such an arrangement, the deformation control member may be formed as an annular disk-like member that has an outer diameter smaller than an outer diameter of the plurality of electrically conductive elements. In one embodiment, the at least one deformable element may include a first and a second electrically conductive contact member, each of which has an associated deformation control member. The interrogation tool may be electrically coupled to the first and second electrically conductive contact members and determine a voltage differential along a portion of the conduit using the first and second electrically conductive contact members.

In other aspects, the disclosure provides a method of interrogating a conduit that includes: passing a device through the conduit that has a deformable element that remains substantially in contact with an internal surface of the conduit during interrogation; providing a deformation control element that reduces a mechanical load on the deformable element. In another aspect, the method includes taking an electrical measurement by the device and using the electrical measurement to estimate a property of interest or characteristic of the conduit. In one aspect, the electrical measurement may be voltage differential along a portion of the conduit. The property of interest may include an estimate of corrosion, pits, gauges, cracks or another physical condition of the conduit.

It should be understood that examples of the more important features of the disclosure have been summarized rather broadly in order that detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DESCRIPTION OF THE DISCLOSURE

Figure 1:
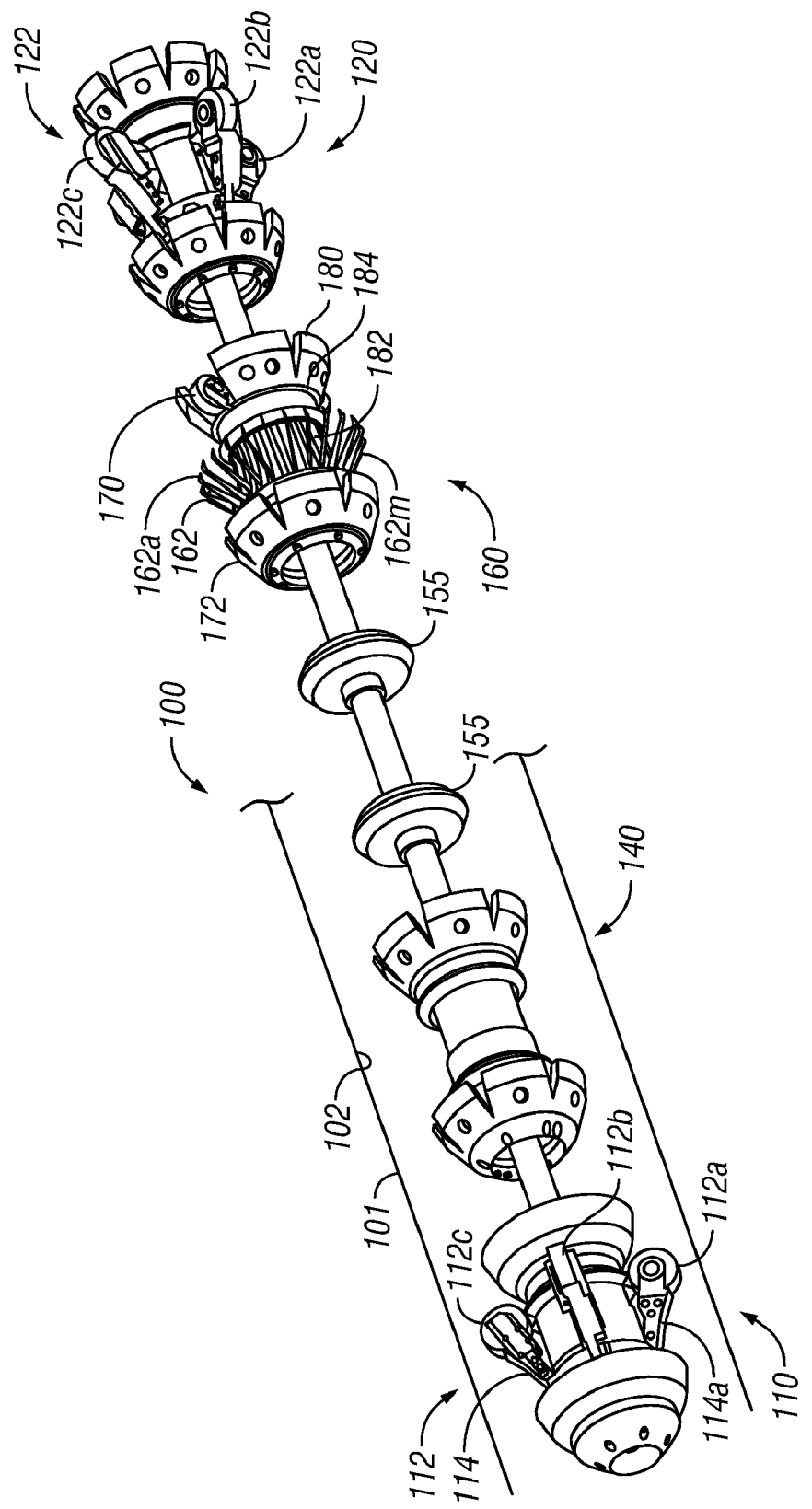
FIG. 1 schematically illustrates an isometric view of one embodiment of an interrogation device made according to the present disclosure.

The present disclosure relates to devices and methods for protecting one or more elements of a device for investigating a structure. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

FIG. 1 schematically illustrates an isometric view of one embodiment 100 of an interrogation device or tool made according to the present disclosure. The device 100 may be utilized to estimate one or more properties of interest, characteristic or condition of a conduit, such as conduit 101. The conduit 101 may be any desired conduit or a tubular, such as a fluid conveying duct or piping in a building, surface or buried pipeline or a portion of a wellbore tubular such as production tubing, coiled tubing, casing or drill pipe. In any case, it may be desirable to investigate the conduit 101 to assess its structural integrity and overall condition. Exemplary conditions of interest include the geometry of the tubular including internal diameters, wall thickness, and the thickness of linings. Other exemplary conditions of interest may include a physical state of the tubular including, but not limited to, the presence of deformities, wear, damage, corrosion, cracks, pitting, scaling. Still other conditions of interest may include the presence of debris or deposits of unwanted materials.

In some situations, a corrosion inhibiting device such as a cathodic protection system may be employed to control the corrosion of metal surfaces of a conduit formed of steel tubulars. As is known, cathodic protection systems convert a surface susceptible to corrosion into a cathode of an electrochemical cell. Exemplary uses of cathodic protection systems include water/fuel pipelines and storage tanks, steel pier piles, ships, offshore oil platforms, subsea wells, land oil well casings, and wellbore tubulars such as casings, liners, coiled tubing, etc. Periodically, it may be desired to monitor and evaluate the effectiveness of such a protection system. The devices used to assess the effectiveness of cathodic protections systems are discussed below. However, it should be understood that the teachings of the present disclosure can be applied to any situation wherein a tool or device is operated in a conduit.

The device 100 is shown to include a front or first contact section 110 and a back or second contact section 120. Each contact section may include one or more contact devices, such as contact wheels, 112a-112c (for ease of explanation, such wheels are herein sometimes individually and/or collectively denoted by numeral 112) in the front contact section and wheels 122a-122c (for convenience, such wheels are herein sometimes individually and/or collectively denoted by numeral 122) in the back contact section 120. The two contact sections 110, 120 are spaced apart longitudinally by a desired distance. The distance may be any desired distance, which may typically vary from one to three meters. In operation, the tool 100 moves inside a conduit, such as conduit 101, to be interrogated along the direction of the front section 110. Electrical measurements, such as voltage differential, made between the wheels 112 of the front contact section and the wheels 122 of the back contact section 122 are utilized to estimate a parameter of interest or characteristic of the conduit. The operation of the tool 100 and the wheels is further described in more detail later.

The tool 100 is further shown to include a section 140 that in one aspect may include a power source that supplies electrical power to the various electrical and electronic devices in the tool 100. The power source may be a turbine that is operated by fluid flow in the conduit 101. In other embodiments, a local power source such as a battery (not shown) may be used. A section, such as section 160 in the tool, may include a caliper 162 that provides measurements for estimating the internal dimensions of the conduit 101. The caliper 162 may include a plurality of contacts 162a-162m, each contact providing a measure of the diameter of the conduit 101. The section 160 also is shown to include an odometer 170 that provides information relating to the travel distance of the tool 100 in the conduit 101. The odometer 170 may be any suitable device that provides a distance measurement. Calipers and odometers are known in the art and are thus not described in detail herein. Elements 155 are used in the tool 100 to provide mechanical support to the tool 100.

Suitable electrical and electronic circuits 180 may be housed in the section 180 or at any other suitable locations in the tool 100. In general, the circuits 180 include a circuit that measures voltage differential between the contact wheels 112 and 122 periodically or substantially continuously when the tool 100 is moving in the conduit 101. The circuit 180 also may include a processor 182, such as a microprocessor, one or more memory devices, such as solid state memory devices, and programs and algorithms, which are used by the processor to implement the methods and operations of the tool 100 and to estimate the parameters of interest or the characteristics of the conduit 101, as desired.

Still referring to FIG. 1, the front contact section 110 is shown to include four contact wheels 112 and similarly the back contact section 120 is shown to include four contact wheels 122. For the purpose of this disclosure, at least one wheel is utilized in each of the front and the back sections and when more than one wheel is utilized, such wheels may be oriented in any suitable manner. In one aspect, each wheel 112 and 122 includes a metallic surface or element that comes in contact with the conduit 101, which is typically a metallic conduit. The metallic element in one aspect may be metallic bristles along the outer periphery of the wheels. A support member, such as member 114a shown for the wheel 112a, extends the wheel radially. As the tool 100 moves in the conduit 101, the support member 114a extend their corresponding wheels 112 toward the inside of the conduit 101 and each of the wheels comes in contact with an inner surface 102 of the conduit 101 and rotates as the tool moves longitudinally along the conduit axis. When the conduit has cathodic protection, the current from the cathodic protection system creates a voltage difference between a wheel in the front section and a wheel in the back section. A voltage measuring device 172 in the tool 100 measures the voltage differential between two contact points formed by the front and the back wheels to evaluate or estimate the condition of the conduit's cathodic protection system.

The processor 182 of the circuits 180 may be configured to process the measurements using one or more programs provided to the processor to and estimate one or more characteristics of the conduit. The processor also may estimate the internal dimensions of the conduit from the caliper 162 measurement and the distance from the odometer 170 proximate the estimated characteristics. The processor 182 may also include communication devices for providing bi-directional data among the devices in the tool 100 and between the tool 100 and a controller outside the conduit 101. The tool 100 also may include one or more devices 184 for determining a position, location or orientation of the interrogation device 20, such as an odometer, a GPS unit, etc. Still other on-board devices may include sensors for measuring parameters of interest such as conduit parameters (e.g., geometry, thickness, etc.), environmental parameters (etc., pressure, temperature), electrical and material properties of the conduit or material in the conduit, etc.

When physical faults exist in the conduit inside, the contact elements may be subjected to undue physical force. A protection mechanism may be used to protect such contact elements, as described in more detail in reference to FIGS. 2A and 2B. Positioned adjacent to one or more of the contact elements 112, and 122 are deformation control members that control the deformation of the contact elements. In some arrangements, the contact elements 112 and 122 may be formed of bristles or other flexible elements that change shape or deform if subjected to a suitably high loading. Exemplary deformations include, but are not limited to, bending, twisting, elongation, compression. In many situations, the interior 102 of the conduit 101 may include features that may cause such a loading and deform the contract elements 112 and 122. The loading may be a radial and/or an axial loading. For instance, the surface 102 may include a radially inwardly projecting feature such as a weld or "icicle" or a surface discontinuity associated with a T-joint. As the tool traverses the conduit 101, the contact elements 112 and 122 may deform upon impact with these features. Because the voltage differential measurements taken by the tool 100 may be very small, such as on the order of microvolts, even relatively small deformations, such as on the order of a few millimeters, may have a detrimental impact on the accuracy of the measurements of the tool 100. Accordingly, in one aspect, the deformation control members, are constructed to assume or bear a portion of a loading that would otherwise deform the contact elements 112 and 122. The reduction of loading reduces the risk that the measurements of the tool 100 may be compromised.

Figure 2A:
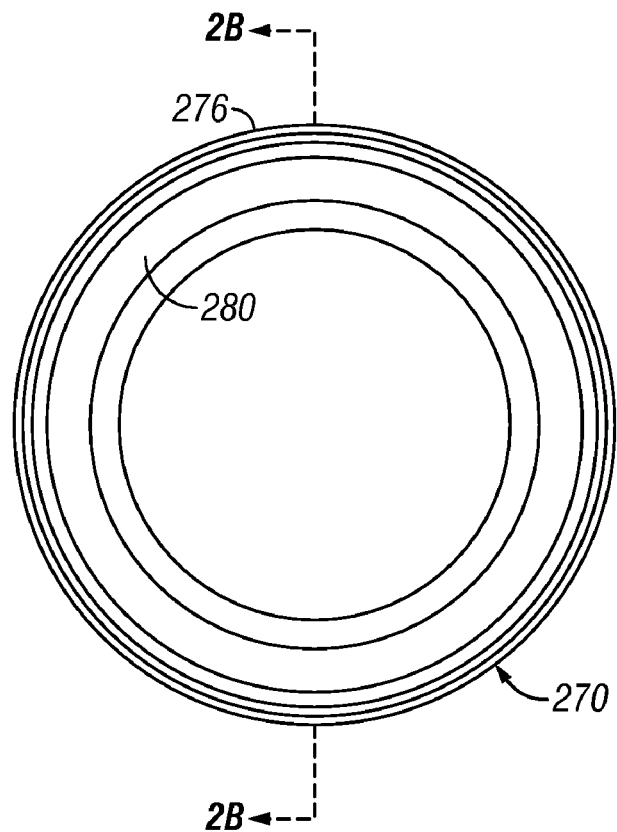
FIG. 2A illustrates a side view of one embodiment of a deformation control member made according to the present disclosure.
Figure 2B:
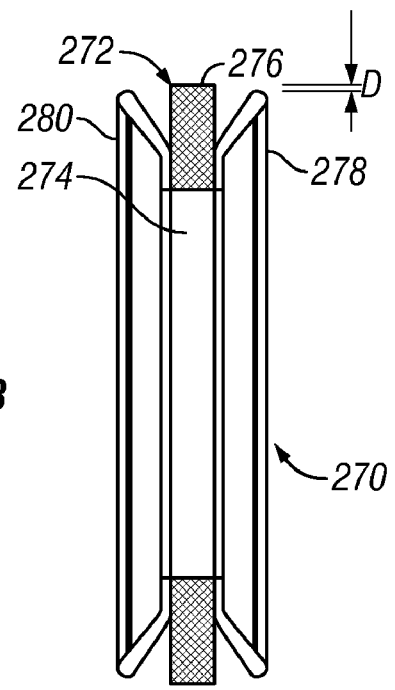
FIG. 2B illustrates a sectional view of the FIG. 2A embodiment.

Referring now to FIGS. 2A and 2B, there is shown one embodiment of a deformation control member 270 for controlling a deformation of an exemplary contact element 272. The contact element 272 includes an annular support or rim 274 on which are mounted the conductive metal bristles 276. The deformation control member 270 includes a first and second annular disk member 278, 280, each being positioned on opposing sides of the contact element 272. The disk members 278, 280 are at least partially formed of a material that is more rigid than the material forming the bristles 276 and have an outer diameter selected to limit a radial deformation of the bristles 276 to an amount denoted by letter D. The relatively greater rigidity allows the disk members 278, 280 to bear a relatively greater compressive loading without deforming and allows the disk members 278, 280 to bear a loading that would otherwise deform the bristles 276 in excess of the amount of numeral D. Thus, in one aspect, the bristles 276 bear a first loading and the disk members 278, 280 eventually bear any loading beyond a threshold value above the first loading. For instance, while an excessive loading may initially be applied to the deformable elements, that excessive loading will be fully borne by the disk members after that excessive loading has caused a maximum deformation D. The value of D may be selected, for example, by first determining a maximum error that may be acceptable for the measurements, determining a magnitude of deformation associated with the maximum acceptable error and selecting a value for D that is no greater than the determined maximum deformation. Other suitable methodologies may also be utilized to select a value for D.

It should be understood that the deformation control member 270 is susceptible to numerous variations. For instance, as schematically illustrated in FIG. 1, the deformation control member 270 can include a single disk or as illustrated in FIGS. 2A-B can include a plurality of disks. Furthermore, the disks can be fixed to and rotate with the contact element, e.g., contact element 272, or be fixed on a bearing element (not shown) that permits the deformation control member 270 to rotate at a speed different from the contact element. In still other embodiments, the deformation control member 270 may be integrated within the contact elements itself. For instance, one or more relatively rigid members (not shown) may be interposed within the bristles 276. The rigid members, which may be bristles, solid or semi-solid members, can bear the loading that would otherwise deform the electrically conductive elements 276 beyond acceptable amounts. Further, while the disks have been shown as contiguous circumferential members, the deformation control members may be strategically positioned at selected locations. That is, in embodiments, the deformation control members can comprise one or more segments, rather than a complete disk.

In the illustrated embodiments, the deformation control member 270 is shown as having an outer diameter that is smaller than the diameter of the contact elements. However, it should be understood that only the load bearing portion of the deformation control member 270 is positioned at a radially recessed position relative to the outer diameter of the contact member. That is, the deformation control member 270 may include a layer of material that deflects or deforms to the same or greater amount than the contact member in the region of numeral D. Such a region can, for example, provide a sufficient barrier for providing a pressure differential but still permit the contact elements to form an electrically conductive junction with the tubular 101.

Furthermore, it should be appreciated that the teachings of the present disclose may be applied to any measurement device wherein a deformable element or member used is used to determine or estimate one or more parameters of a structure. For instance, a deformation of a member may change an electrical response or material property of that member, which may in turn degrade measurements obtained using that member. For such measurement devices, a deformation control member may be used to limit a deformation encountered by that member to an acceptable or predetermined range.

Thus, in aspects, the disclosure provides a tool that includes laterally spaced electrical contact points that come in contact with internal surfaces of a conduit. In one aspect, the contacts may be wheels that press against the conduit inside and rotate as the tool moves in the conduit, which movement may be due to a fluid flowing through the conduit or by another mechanism. In one aspect, the wheels include an element that deforms as it presses against the conduit inside. In one aspect, a deformation control member is placed proximate or adjacent each of the deformable contact member that controls or inhibits the deformation of the contact members beyond a selected amount. The tool in other aspects may include one or more other devices or sensors, such a caliper for measuring internal dimension of the conduit, an odometer to determine distance or location of the internal characteristics of the conduit, and sensors for measuring temperature, pressure, etc. of the fluid flowing through the conduit.

In another aspect, the disclosure provides an apparatus for interrogating a conduit that includes: at least one deformable element that may engage a surface of the conduit; an interrogation tool coupled to the at least one deformable element that uses the at least one deformable element to determine a parameter of interest relating to the conduit; and at least one deformation control member positioned adjacent the at least one deformable element, wherein the deformation control member controls a deformation of the at least one deformable element. The at least one deformable element may include one or more electrically conductive elements which are circumferentially disposed on a radial outer surface of a rim and wherein the deformation control member is formed as an annular member having an outer diameter smaller than an outer diameter of the electrically conductive elements.

The tool is electrically coupled to the conduit via the first and second electrically conductive contact members and determines a voltage differential along a portion of the conduit using the first and second electrically conductive contact members. The deformation control member may be more rigid than the at least one deformable element. The deformation control member may limit a reduction in a radial dimension of the at least one deformable element or any other aspect thereof.

In another aspect, a method is disclosed that includes: engaging a surface of the conduit with at least one deformable element; controlling a deformation of the at least one deformable element with a deformation control member; and using an electrical measurement from the at least one deformable element to estimate a parameter of interest relating to the conduit. In one aspect, the parameter of interest may be voltage differential. In another aspect, controlling the deformation may include limiting the deformation to a predetermined value or positioning the at least one deformable element to receive a loading above a predetermined value. In another aspect, the method may further include propelling the at least one deformable element through a bore of the conduit.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

We claim:

1. A method for interrogating a conduit, comprising:
   positioning a plurality of electrically conductive bristles and at least one relatively more rigid disk member on a support member wherein an outer diameter of the at least one disk member is smaller than an outer diameter of the electrically conductive bristles and wherein a load bearing portion of the at least one disk member is positioned at a radially recessed position relative to the outer diameter of the electrically conductive bristles;
   moving the electrically conductive bristles and the at least disk member inside the conduit;
   engaging an inner surface of the conduit with the electrically conductive bristles by radially extending the electrically conductive bristles, wherein an electrical response of the electrically conductive bristles changes due to a deformation of the electrically conductive bristles;
   moving the electrically conductive bristles and the at least disk member inside the conduit and engaging a radially inwardly projecting feature of the inner surface of the conduit with the at least one disk member;
   measuring an electrical voltage differential across a portion of the conduit using the electrically conductive bristles; and
   determining a parameter of interest relating to the conduit using the measured electrical voltage differential.

2. The method of claim 1, further comprising measuring the electrical voltage differential across a portion of the conduit using the electrically conductive bristles and a second set of electrically conductive bristles axially spaced apart from the electrically conductive bristles.

3. The method of claim 1 further comprising controlling the deformation by:
   bearing a first load with the electrically conductive bristles; and
   bearing a second loading with the disk member for a loading beyond a threshold value to thereby limit a deformation of the electrically conductive bristles to a predetermined value; wherein the first and the second loading are caused by the inwardly projecting feature.

4. The method of claim 1 further comprising controlling a deformation of the electrically conductive bristles by positioning the electrically conductive bristles relative to the disk member to absorb a loading above a predetermined value.

5. A method for interrogating a conduit, comprising:
   moving a plurality of electrically conductive bristles inside the conduit;
   engaging an inner surface of the conduit with the electrically conductive bristles, wherein an electrical response of the electrically conductive bristles changes due to a deformation of the electrically conductive bristles;
   protecting the electrically conductive bristles from radial deformation with a disk member that is more rigid than the electrically conductive bristles, the electrically conductive bristles and the disk member being positioned on a support member, the disk member being configured to engage the surface of the conduit to protect the electrically conductive bristles; and
   determining a parameter of interest relating to the conduit by measuring a voltage differential across a portion of the conduit using the electrically conductive bristles, wherein an outer diameter of the disk member is smaller than an outer diameter of the electrically conductive bristles and wherein a load bearing portion of the disk member is positioned at a radially recessed position relative to the outer diameter of the electrically conductive bristles.

* * * * *